United States Patent
Suzuki

(10) Patent No.: US 7,963,659 B2
(45) Date of Patent: Jun. 21, 2011

(54) PROJECTOR

(75) Inventor: Masakazu Suzuki, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 662 days.

(21) Appl. No.: 11/717,649

(22) Filed: Mar. 14, 2007

(65) Prior Publication Data

US 2007/0216874 A1   Sep. 20, 2007

(30) Foreign Application Priority Data

Mar. 15, 2006   (JP) ................... 2006-071257

(51) Int. Cl.
  *G03B 21/26*   (2006.01)
  *G03B 21/16*   (2006.01)
  *B60Q 1/06*   (2006.01)
  *F21V 29/00*   (2006.01)
(52) U.S. Cl. ............... 353/61; 353/58; 362/373
(58) Field of Classification Search ............ 353/61, 353/57, 58, 60, 119; 362/294, 373, 264; 348/748; 352/202
See application file for complete search history.

(56) References Cited

U.S. PATENT DOCUMENTS

| | | | |
|---|---|---|---|
| 7,472,996 B2 * | 1/2009 | Suzuki ................ | 353/60 |
| 7,481,540 B2 * | 1/2009 | Morimoto et al. ........ | 353/57 |
| 7,591,571 B2 * | 9/2009 | Takeda ................ | 362/373 |
| 7,594,739 B2 * | 9/2009 | Taguchi et al. ........ | 362/373 |
| 2001/0021006 A1 | 9/2001 | Shimizu | |
| 2003/0179579 A1 * | 9/2003 | Hsu et al. ............ | 362/294 |
| 2004/0233399 A1 | 11/2004 | Katsuma et al. | |
| 2004/0263799 A1 | 12/2004 | Lim | |
| 2006/0056182 A1 * | 3/2006 | Murasugi ............. | 362/294 |
| 2006/0109656 A1 * | 5/2006 | Takeda ............... | 362/294 |

FOREIGN PATENT DOCUMENTS

| | | |
|---|---|---|
| JP | 2001-216536 | 8/2001 |
| JP | 2002352604 | 12/2002 |
| JP | 2003-344949 | 12/2003 |

* cited by examiner

*Primary Examiner* — William C Dowling
*Assistant Examiner* — Ryan Howard
(74) *Attorney, Agent, or Firm* — Pillsbury Winthrop Shaw Pittman, LLP

(57) ABSTRACT

A direction control plate is fitted near an exhaust aperture of a lamp unit, and a partition plate is fitted so as to surround the front and the bottom of the exhaust aperture. The direction control plate is fitted so as to surround three sides of the periphery of the exhaust aperture in the shape of a letter "U". Furthermore, the side plate is provided so as somewhat to close the exhaust aperture, and so as to be inclined by an angle θ towards the wall of a case. If a lamp within the lamp unit should break, the direction of scattering of the broken pieces is controlled by this direction control plate, and it is possible to prevent these broken pieces from being scattered to the exterior of the device, since the broken pieces can be made to collide with the partition plate.

1 Claim, 4 Drawing Sheets

PROJECTOR

CROSS REFERENCE

This Nonprovisional application claims priority under 35 U.S.C. §119(a) on Patent Application No. 2006-071257 filed in Japan on Mar. 15, 2006, the entire contents of which are hereby incorporated by reference.

BACKGROUND OF THE INVENTION

The present invention relates to a structure which, upon failure of the lamp of a projector, prevents scattering of broken pieces of the lamp to the exterior of the projector main body.

Recently, a type of projector has become widespread which irradiates light from a lamp upon a picture display device such as a digital micromirror device (DMD) or a liquid crystal display device or the like, and projects a picture which is displayed upon this picture display device upon a screen.

With this type of projector, sometimes for one reason or another the lamp which is used as a light source fails, and may break. Due to this, in order for the user not to be injured by the broken pieces of the lamp, inventions have been disclosed related to a projector or to a projection type display device which is built so that, upon failure of the lamp, the broken pieces do not scatter directly to the exterior.

With the liquid crystal projector described in Japanese Laid-Open Patent Publication 2001-216536, an air flow conduit, an intake aperture, and an exhaust aperture are formed in a lamp unit for cooling the lamp. Furthermore, a plurality of vent portions consisting of metallic plates with holes punched out therefrom are provided in this intake aperture and exhaust aperture of the lamp unit. However, since these vent portions have the structure described above, during use, dust adheres to the holes and the venting characteristic becomes bad, so that it becomes impossible to cool the lamp with good efficiency.

Furthermore, with the projection type display device described in Japanese Laid-Open Patent Publication 2003-344949, an exhaust fan is attached to an exhaust aperture of the light source unit. Due to this, when the lamp breaks, the majority of the broken pieces collide with the inner walls of the duct; but sometimes broken pieces of size greater than or equal to 0.8 $mm^2$, which is defined by a safety standard, are scattered to the exterior of the device at a speed which is almost equal to the speed of the exhaust flow from the exhaust aperture, which is undesirable.

The object of the present invention is to provide a projector with which dust does not collect in an intake aperture or an exhaust aperture for cooling the lamp unit, and moreover with which, upon damage to the lamp, broken pieces of a size greater than that determined by the safety standard are not scattered to the exterior.

SUMMARY OF THE INVENTION

The projector according to the present invention includes a lamp unit, in the external wall of which an intake aperture and an exhaust aperture are formed, and in the interior of which a lamp is installed. Moreover it includes an intake fan which sucks in air from said intake aperture and cools said lamp therewith, and a partition plate which is installed so as to face forward of said exhaust aperture of said lamp unit.

Since, even if broken pieces of the lamp are scattered from the exhaust aperture of the lamp unit, they collide with the partition plate and fall down, accordingly it is possible to prevent these broken pieces of the lamp from being scattered to the exterior of the projector. Furthermore, since it is possible to prevent such broken pieces of the lamp from being scattered even though no nets are fitted to the exhaust apertures, accordingly it is possible to prevent the venting characteristics from becoming bad due to dust accumulating in the exhaust apertures.

DETAILED DESCRIPTION OF THE INVENTION

Figure 1:
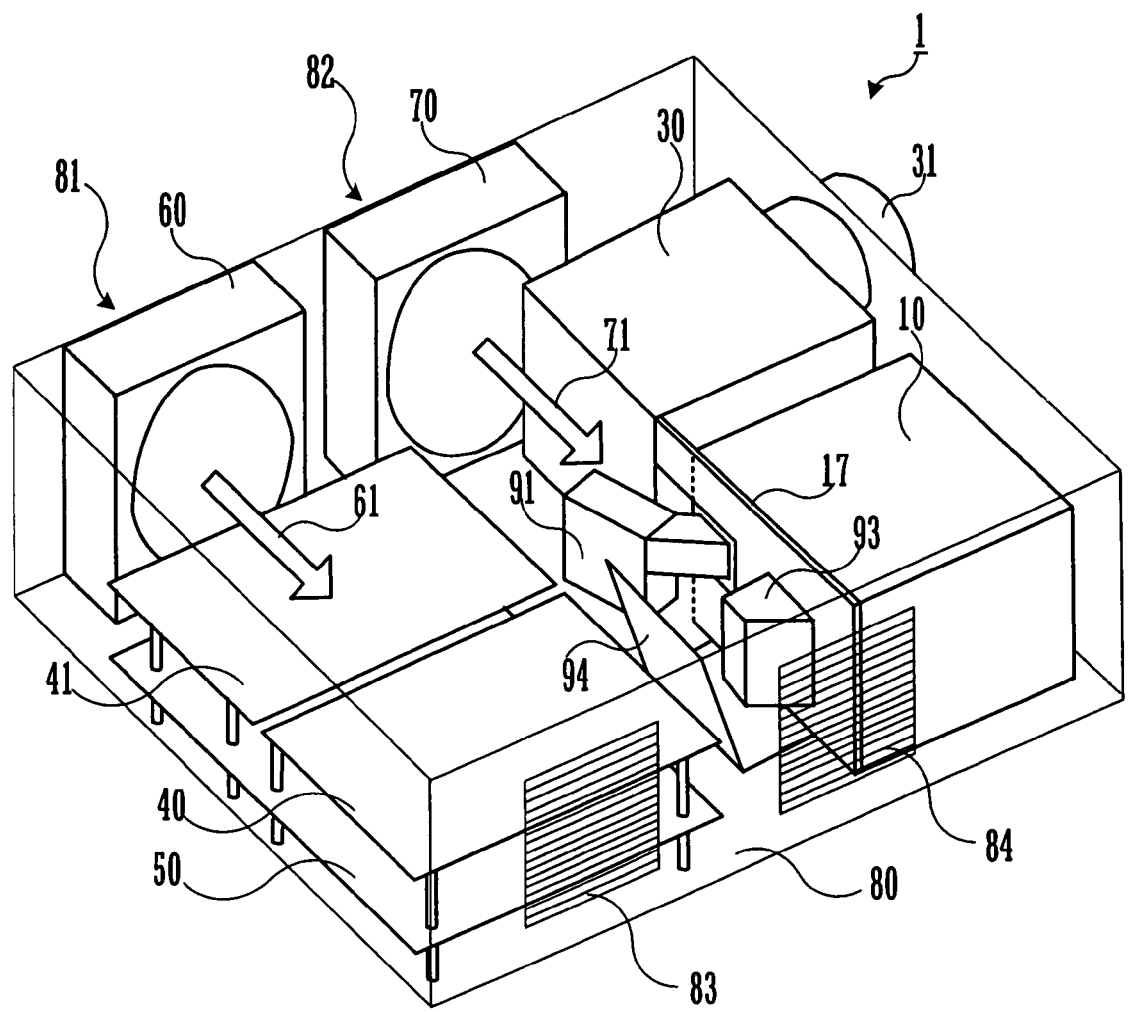
FIG. 1 is a perspective view showing the schematic internal construction of a projector.

FIG. 1 is a perspective view showing the schematic construction of the interior of a projector. This projector 1 comprises a lamp unit 10, a picture projection unit 30, power supply circuit boards 40 and 41, a control circuit board 50, and main fans 60 and 70. All of these are mounted upon a chassis 80. The lamp unit 10 emits light for picture projection. The picture projection unit 30 comprises a picture display device such as a DMD or the like and a color wheel (not shown in the drawings). Using light from the lamp unit 10, this picture projection unit 30 projects a picture which is formed by the picture display device from a projection lens 31. The power supply circuit boards 40, 41 supply power to the lamp unit 10 and so on. The control circuit board 50 controls the operation of the color wheel and the picture display device and the like, not shown in the figures, which are provided to the picture projection unit 30.

The main fans 60, 70 are propeller fans, and are fitted to intake apertures 81, 82 which are formed in one side of the chassis 80. These main fans 60, 70 take in external air from the intake apertures 81, 82 and exhaust it from exhaust apertures 83, 84 which hare formed in the opposite side of the chassis 80. Due to this, the interior of the main body of the projector 1 is air cooled. It should be understood that, in FIG. 1, the direction of the flow of air due to the main fans 60, 70 is shown by the white arrows 61, 71. Furthermore, this projector 1 comprises an intake fan 91 for air cooling the lamp unit 10. This intake fan 91 cools a lamp which is provided within the lamp unit 10 by sucking in air which is being blown through the interior of the main body by the main fans 60, 70. The air which is discharged from the lamp unit 10 is discharged to the exterior of the main body by the main fans 60, 70.

Figure 2:
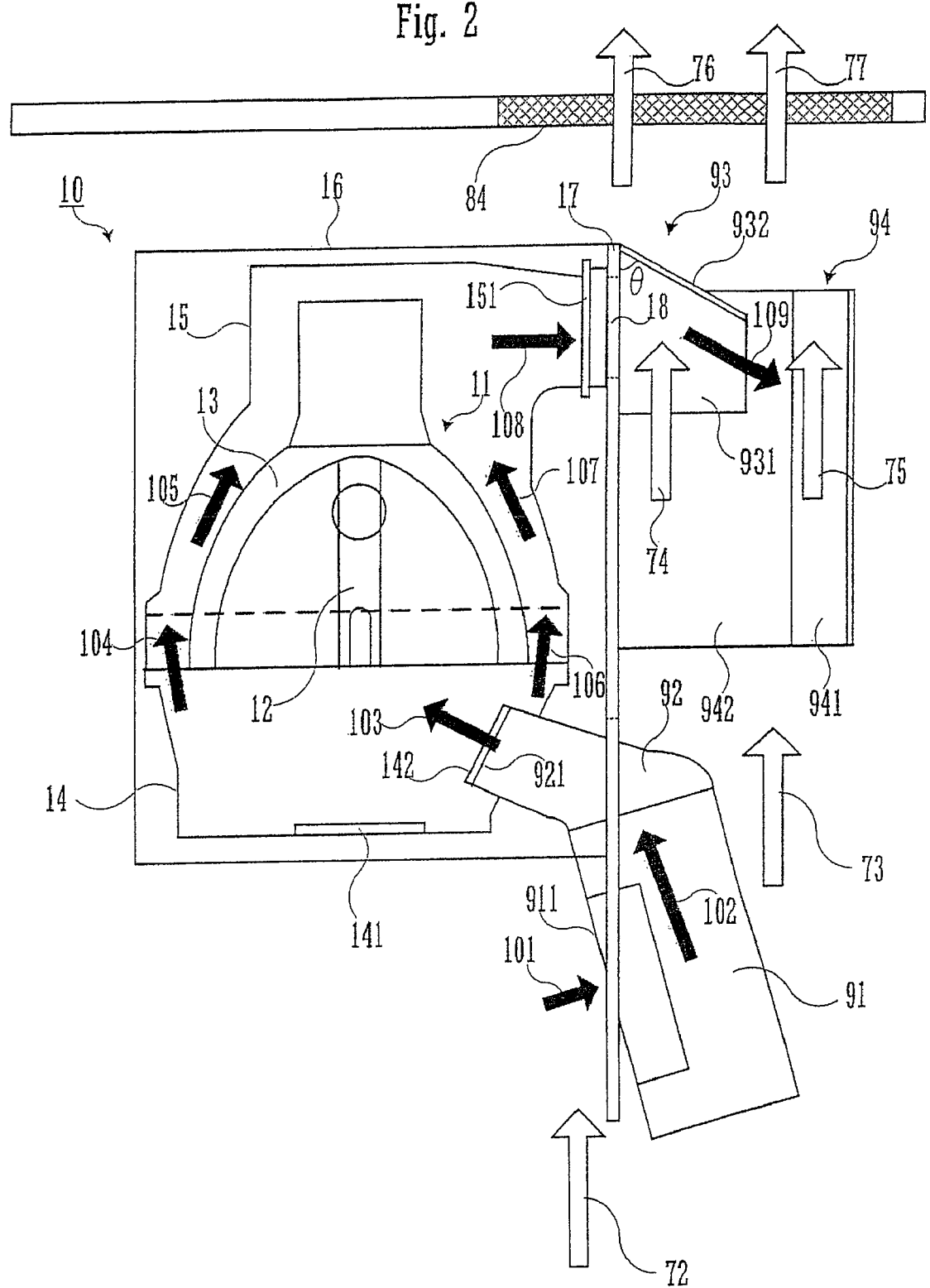
FIG. 2 is a cutaway plan view showing the schematic structure of a lamp unit.
Figure 3:
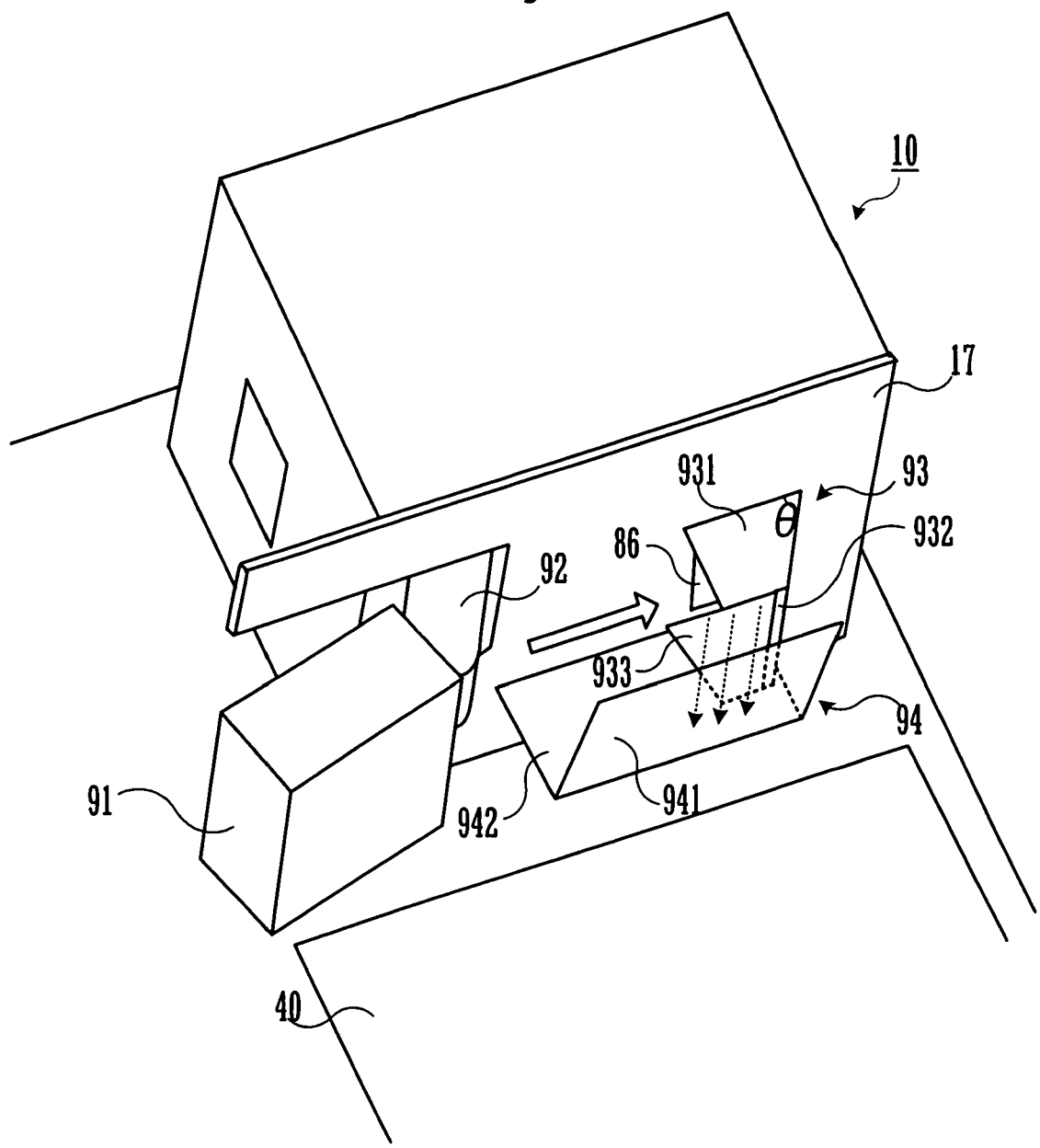
FIG. 3 is a perspective view showing the structure of the lamp unit and its surroundings.

FIG. 2 is a cutaway plan view showing the schematic structure of the lamp unit 10, while FIG. 3 is a perspective view showing the structure of the lamp unit 10 and its surroundings. As shown in FIG. 2, the lamp unit 10 comprises a lamp 11 which comprises a lamp bulb 12 and a reflector 13, a front cover 14, a rear cover 15, and a cable (not shown in the figures) which supplies electrical power to the lamp bulb 12 and the like and is housed in a case 16. The front cover 14 comprises a projection aperture 141 through which light from the light bulb 12 is projected, and an intake aperture 142 for air cooling the lamp 11. The front cover 14 is fitted to the front side of the lamp 11.

The rear cover 15 is provided with an exhaust aperture 151 for discharging the air which has cooled the lamp bulb 12. Moreover, the exhaust aperture 151 is communicated with an exhaust aperture 18 which is formed in the wall 17 of the case 16. This rear cover 15 is fitted to the rear side of the lamp 11.

Furthermore, as shown in FIGS. 2 and 3, to the lamp unit 10, there are fitted the intake fan 91, a duct 92, a direction control plate 93, and a partition plate 94. The intake fan 91 is a sirocco type (multi-bladed) fan, and is connected to the duct 92. The exhaust aperture 921 of the duct 92 is joined to the intake aperture 142 of the front cover 14 of the lamp unit 10. The direction control plate 93 comprises an upper plate 931, a side plate 932, and a lower plate 933. This direction control plate 93 is fitted around three sides of the periphery of the exhaust aperture 151 (18), in other words, so as to surround the upper and lower sides of the exhaust aperture 151 (18) and the downstream side of the exhaust 73 of the main fan 70 around three sides thereof in the shape of a letter "U". Furthermore, the side plate 932 is inclined at an angle of θ in the central direction of the main body of the projector 1 with respect to the wall 17 of the case 16, so as to block up the exhaust aperture 18 to a certain extent. This direction control plate 93 is provided so as to control the direction of the exhaust from the lamp unit 10, and so as, if the lamp 11 should fail, to prevent broken pieces from flying off.

The partition plate 94 comprises a side plate 941 and a lower plate 942. This partition plate 94 is fitted at a fixed distance from the direction control plate 93, so as to surround the front side and the bottom side of the exhaust aperture 151 (18) and the direction control plate 93 in the shape of a letter "L". The partition plate 94 is provided in order, if the lamp 11 should fail, to prevent broken pieces from flying off.

Next, the interior of the main body of the projector 1 and the lamp unit 10 are cooled by the flow of air, as shown by the white arrows 72~76 and the black arrows 101~109 in FIG. 2. First, the intake fan 91 sucks in, from the intake aperture 911, air which has been brought into the interior of the main body by the main fan 70, and blows it via the duct 92 into the front cover 14. This air which has been blown into the front cover 14 passes around the periphery of the reflector 13 of the lamp 11, and is discharged from the exhaust aperture 151 of the rear cover 15. At this time, the discharge direction of the air which is thus discharged from the exhaust aperture 151 is controlled by the direction control plate 93, and it is discharged towards the center side of the device main body. And this air which is discharged from the exhaust aperture 151 strikes the partition plate 94, and is then discharged to the exterior of the device main body, along with the air blown by the main fan 70.

Furthermore, with this projector 1, if for any reason the lamp 11 should be broken, then, as explained below, the broken fragments of the lamp 11 are discharged from the exhaust aperture 151 along with the air that has cooled the lamp unit 10, and, due to the direction control plate 93 and the partition plate 94, are prevented from being discharged to the exterior of the main body of the projector 1.

Since, in this manner, the partition plate 94 is installed so as to be a fixed distance away from the direction control plate 93, accordingly the air flow due to the main fan 70 passes between the direction control plate 93 and the partition plate 94. The air flow 74 which passes the direction control plate 93 collides with the side plate 932, and flows in the direction of the air flow 109 which is discharged from the exhaust aperture 151. And these collide with the side plate 941 of the partition plate 94, and flow in the direction of the air flow 75. Accordingly, if for any reason the lamp 11 breaks, and some broken shards of the lamp 11 are included in the exhaust from the exhaust aperture 151 (18), then some of these broken pieces will collide with the side plate 932 of the direction control plate 93 and will fall down. Furthermore, the majority of these broken pieces will collide with the side plate 941 of the partition plate 94 and will also fall down. Thus, even if some broken pieces of the lamp 11 are included in the exhaust from the lamp unit 10, since these broken pieces are eliminated due to the direction control plate 93 and the partition plate 94, accordingly they are not discharged to the exterior of the device main body along with the flow of air from the main fan 70.

Furthermore, as described above, the side plate 932 of the direction control plate 93 is inclined at the angle θ with respect to the wall 17 of the case 16. Due to this, the side plate 932 controls the direction of the air flow so that, if broken pieces of a lamp 11 are included in the exhaust from the lamp unit 10, these broken pieces are scattered in the direction of the center of the main body of the projector 1. Due to this, it is possible to prevent the broken pieces from being scattered to the outside of the lower plate 942 of the partition plate 94.

Figure 4:
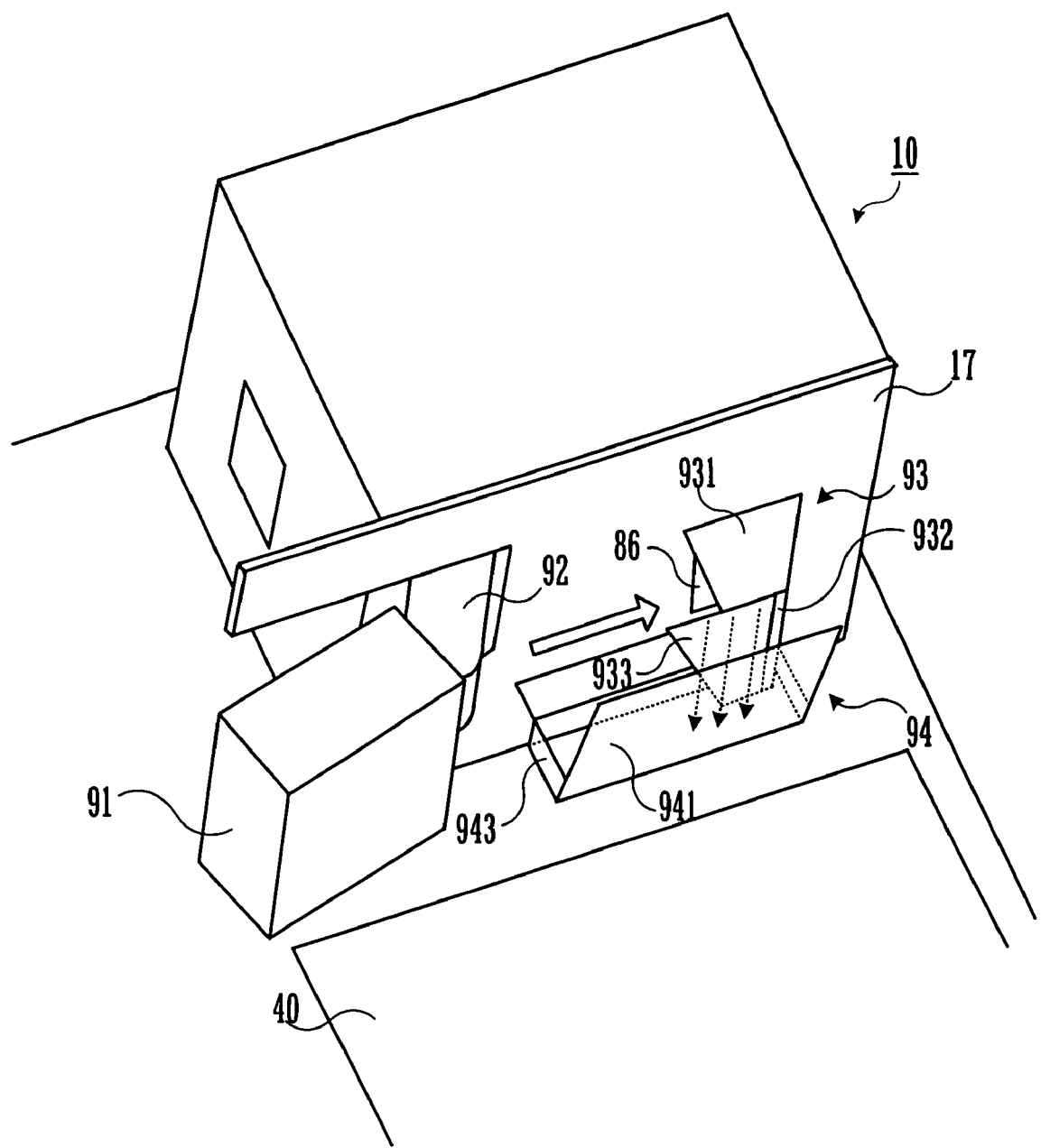
FIG. 4 is a perspective view showing a structure for the lamp unit and its surroundings, different from that shown in FIG. 3.

FIG. 4 is a perspective view showing an alternative structure for the lamp unit and its surrounding elements, different from that shown in FIG. 3. The partition plate 94 is not limited to being formed in the shape of a letter "L"; it would also be acceptable for it to be of some other shape. For example, with this partition plate 94, the lower plate 943 may be formed in the shape of a box without a lid. Since, with this structure, the partition plate 94 assumes a shape like a pocket, accordingly the broken pieces do not fall from the lower plate 943 of the partition plate 94 to the outside thereof, but rather, such broken pieces can be accumulated upon the lower plate 943 of the partition plate 94.

Moreover, it would also be acceptable to arrange to stick some shock absorption material such as sponge or the like to the partition plate 94. By doing this, when the broken pieces of the lamp 11 collide with the partition plate 94, it is possible to reduce the speed of these broken pieces. Accordingly, along with the broken pieces being thrown back after collision with the partition plate 94 and then being exhausted for a second time, it is possible to prevent them from being discharged to the exterior of the main body of the projector 1.

Furthermore, it would also be possible for the partition plate 94 to be made in a mesh form, for example using a wire net or the like. At this time, it is preferable to adjust the size of this mesh so that the broken pieces of the lamp 11 which pass the partition plate in the form of a mesh are not scattered towards the power supply circuit boards 40, 41 or the control circuit board 50 or the like.

Yet further, it would also be possible to fix exchangeable nets to the exhaust apertures 83, 84 which are formed on the opposite side of the chassis 80. At this time, with regard to the size of the holes in these nets, it is desirable to employ a size such that broken pieces of the lamp 11 of a size greater than that prescribed by the safety standard are not scattered to the exterior of the main body of the projector 1. By doing this, even if it has not been possible to cause all of the broken pieces to fall down due to the action of the direction control plate 93 and the partition plate 94, it may still be ensured than only broken pieces of size less than 0.8 mm$^2$ are discharged to the exterior of the main body of the projector 1, as prescribed by the safety standard.

As described above, even if for some reason the lamp of the lamp unit 10 should be broken, and broken pieces thereof should be discharged along with the exhaust, it is possible to ensure that these broken pieces should collide with the direction control plate 93 and the partition plate 94. Due to this, the broken pieces of the lamp 11 are not discharged to the exterior of the main body of the projector 1.

Finally, in the above described explanation of an embodiment of the present invention, all of the features are shown by way of example, and should not be considered as being limitative of the present invention. The scope of the present invention is not to be defined by any of the features of the embodiment described above, but only by the scope of the appended Claims. Moreover, equivalents to elements in the Claims, and variations within their legitimate and proper scope, are also to be considered as being included within the range of the present invention.

What is claimed is:

1. A projector, comprising:
a chassis having a first intake aperture in one side and a first exhaust aperture in an opposite side of the one side;
a lamp unit having a lamp, a front cover, and a rear cover, the lamp being provided with a lamp bulb, the front cover being installed at a front side of the lamp, a second intake aperture being formed in the front cover, the rear cover being installed at a rear side of the lamp, a second exhaust aperture being formed at a side wall of the rear cover, the lamp being installed inside of the front cover and the rear cover;
an intake fan which is connected to the second intake aperture, sucks in air, blows the air to the second intake aperture, and exhausts a first air flow from the second exhaust aperture to the chassis with the air which passes around periphery of the lamp;
a partition plate which is installed so as to face forward of the second exhaust aperture along the direction from the first intake aperture to the first exhaust aperture;
a main fan which generates a second air flow flowing from the first intake aperture to the first exhaust aperture and merging with the first air flow exhausted from the second exhaust aperture when passing between the second exhaust aperture and the partition plate;
a direction control plate which is provided with the second exhaust aperture and which comprises three plates surrounding the second exhaust aperture: an upper plate, a side plate, and a lower plate, the side plate being inclined in a direction to close the second exhaust aperture; and
a bottom portion of a box shape provided between the partition plate and the second exhaust aperture and below the direction control plate.

* * * * *